(12) United States Patent
Quincerot et al.

(10) Patent No.: US 8,770,163 B2
(45) Date of Patent: Jul. 8, 2014

(54) STARTER DEVICE FOR COMBUSTION ENGINE, PARTICULARLY OF MOTOR VEHICLE

(75) Inventors: Julien Quincerot, Maisons Alfort (FR); Karine Stofleth, Maisons Alfort (FR); Jean-Marc Dubus, Chevilly la Rue (FR); Arnaud Devries, Vanves (FR); Michaël Chemin, Festigny (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 1087 days.

(21) Appl. No.: 12/663,618

(22) PCT Filed: Jun. 16, 2008

(86) PCT No.: PCT/FR2008/051073
§ 371 (c)(1),
(2), (4) Date: May 25, 2010

(87) PCT Pub. No.: WO2009/004240
PCT Pub. Date: Jan. 8, 2009

(65) Prior Publication Data
US 2010/0257951 A1   Oct. 14, 2010

(30) Foreign Application Priority Data
Jun. 29, 2007 (FR) ........................ 07 56134

(51) Int. Cl.
*F02N 11/08* (2006.01)
*F02N 15/00* (2006.01)
(52) U.S. Cl.
USPC ............................................. 123/179.1; 74/6
(58) Field of Classification Search
USPC ................. 123/179.1, 179.3, 179.25, 179.28, 123/185.5, 185.18; 471/109, 133–135, 110; 74/6, 10.7
See application file for complete search history.

(56) References Cited

U.S. PATENT DOCUMENTS

| | | | |
|---|---|---|---|
| 6,817,328 B2 * | 11/2004 | Buglione et al. | 123/179.25 |
| 6,834,631 B1 * | 12/2004 | Blackburn et al. | 123/179.3 |
| 7,322,895 B2 * | 1/2008 | Namuduri | 474/110 |
| 8,439,780 B2 * | 5/2013 | Ruffini et al. | 474/134 |

FOREIGN PATENT DOCUMENTS

| | | |
|---|---|---|
| EP | 1 394 405 A1 | 3/2004 |
| FR | 2 833 058 A1 | 6/2003 |
| WO | WO 02/35087 A1 | 5/2002 |
| WO | WO 02/060711 A1 | 8/2002 |
| WO | WO 2004/101974 A1 | 11/2004 |

* cited by examiner

*Primary Examiner* — Hieu T Vo
(74) *Attorney, Agent, or Firm* — Berenato & White, LLC

(57) ABSTRACT

A starter device (10) for a combustion engine (1), particularly of a motor vehicle. The device includes a rotary electrical machine (11) comprising a drive member (12) and a tensioner. A belt (13) collaborates with the drive member of the rotary electrical machine and with the combustion engine in order that the latter can be started using the belt rotationally driven by the electrical machine in a first direction (A). A tensioner (15) presses against a length (16) of the belt that runs between the electrical machine and the combustion engine. As the rotary electrical machine rotates in a second direction (B) the opposite of the first, it is possible for the tensioner to be brought from a stopped position into a position for beginning to start the combustion engine. The movement from the stopped position to the position for beginning to start being accompanied by a lengthening of said length of belt and/or by an increase in the tension in this length of belt.

15 Claims, 4 Drawing Sheets

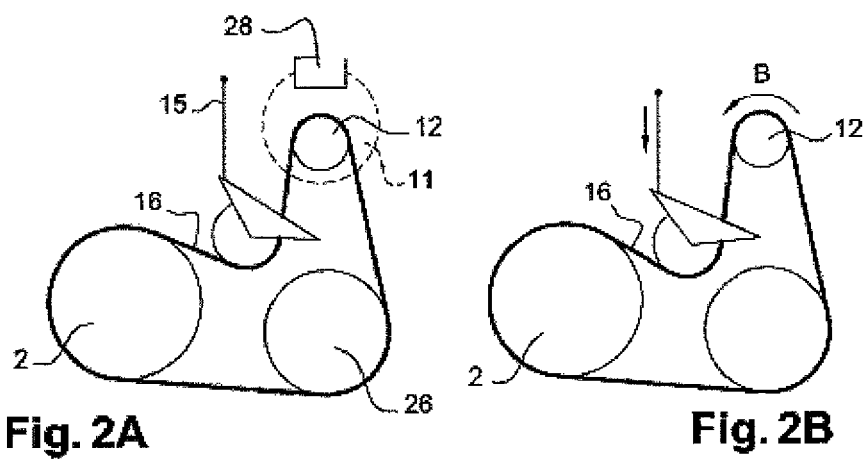
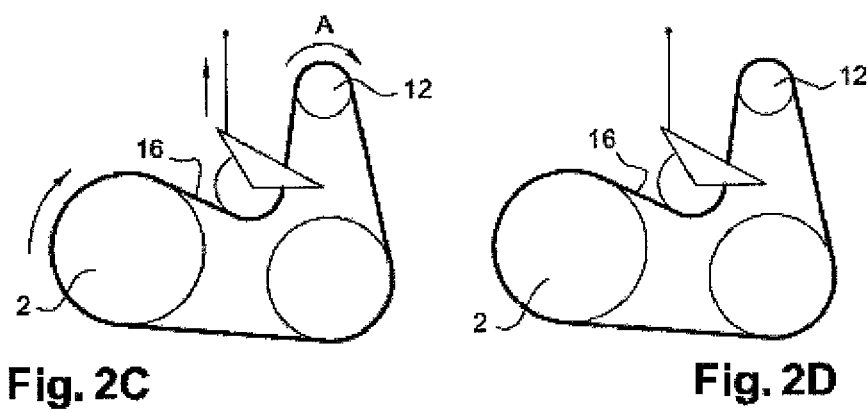
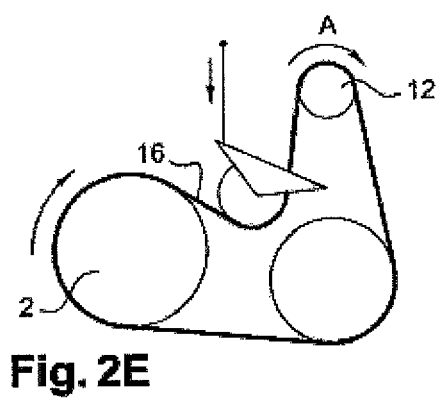
Fig. 2A  Fig. 2B  Fig. 2C  Fig. 2D  Fig. 2E

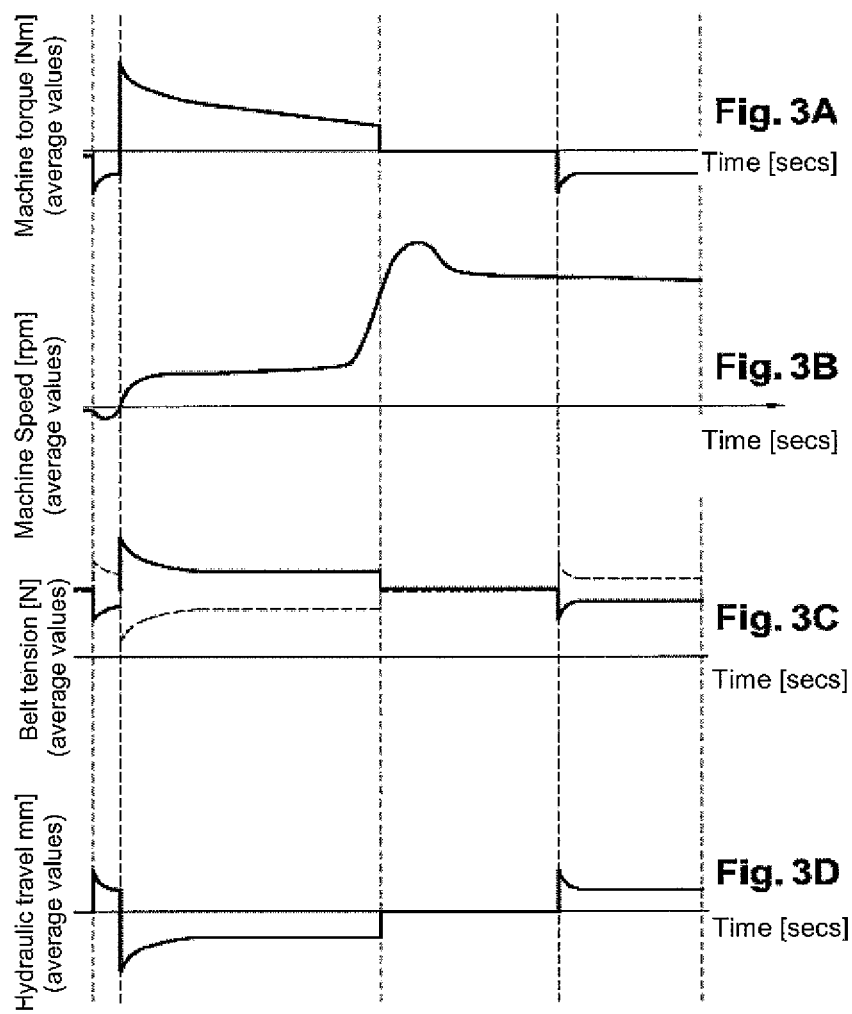

STARTER DEVICE FOR COMBUSTION ENGINE, PARTICULARLY OF MOTOR VEHICLE

FIELD OF THE INVENTION

The invention relates to a starter device for a combustion engine, particularly of a motor vehicle.

BACKGROUND OF THE INVENTION

Usually, the designation "Stop & Start" refers to a technology enabling the automatic stop and restart of a motor vehicle combustion engine in situations in which the vehicle is stationary, with the engine running, for example at a red light, in a traffic jam, etc.

In order to restart the combustion engine, it is known to use a reversible alternator providing, in addition to the alternator function supplying electrical power to cover the needs of the vehicle, the function of starting the combustion engine.

This reversible alternator is, in some cases, installed at a facade of the combustion engine, over which facade extends a crankshaft pulley mounted on the combustion engine.

A belt is provided, on the one hand, to drive the alternator and, if required one or more accessories, when the combustion engine is operating, and on the other, to transmit a torque delivered by the reversible alternator to the crankshaft pulley during restarting stages.

In this type of technology, it is important to guarantee good control of the sliding movement between the belt and pulleys of the facade of the engine, in order to particularly enable correct transmission of the torque from the alternator to the crankshaft pulley.

Indeed, sliding of the belt on certain pulleys can make the restarting of the combustion engine impossible.

SUMMARY OF THE INVENTION

The aim of the present invention is to improve the combustion engine starting conditions, particularly by controlling the sliding movement between the belt and certain pulleys of the facade of the engine during restarting. The subject matter of the invention is therefore a starter device for a combustion engine, particularly of a motor vehicle, comprising;
  a rotary electrical machine comprising a drive member,
  a transmission member, particularly a belt or a chain, collaborating with the drive member of the rotary electrical machine and with the combustion engine in order that the latter can be started using the transmission member rotationally driven by the rotary electrical machine in a first direction (A),
  a control system for operating the rotation of the rotary electrical machine in the first direction (A) in order to start the combustion engine and, in a stage prior to starting, in a second direction the opposite of the first direction.

According to one aspect of the invention, the starter device comprises:
  a rotary electrical machine comprising a drive member,
  a transmission member, particularly a belt, collaborating with the drive member of the rotary electrical machine and with the combustion engine in order that the latter can be started using the belt rotationally driven by the electrical machine in a first direction,
  a tensioner pressing against a length of the belt that runs between the rotary electrical machine and the combustion engine, it being possible, as the rotary electrical machine rotates in a second direction the opposite of the first direction, for the tensioner to be brought from a stopped position into a position for beginning to start the combustion engine, the movement from the stopped position to the position for beginning to start being accompanied by a lengthening of said length of belt and/or by an increase in the tension in this length of belt.

Thanks to the invention, due to a lengthening of said length and/or an increase in the tension in this length of belt which is used to transmit the torque of the rotary electrical machine to the combustion engine (said length being a stiff length when the combustion engine is started), sliding of the belt is reduced, which enables reliable restarting of the combustion engine.

This method of causing a lengthening of said length and/or an increase in the tension in the length of belt by using the tensioner and by rotating in advance the rotary electrical machine, over a certain angle, in an opposite direction to the direction for starting, is particularly simple, and in particular does not require additional equipment.

Preferably, the tensioner is arranged such that, once the combustion engine has started, said length of the belt returns to a lesser length than in the position for beginning to start.

Advantageously, the device comprises a roller in contact with said length of the belt, this roller being arranged to be moved when the tensioner is brought from the stopped position into the position for beginning to start, particularly in order to lengthen said length of belt and/or increase the tension in this length of belt.

In one embodiment of the invention, the tensioner is arranged such that the length of said length of belt gradually reduces between the beginning to start and the actual starting of the combustion engine.

Advantageously, the tensioner is arranged so as to be able to be released when moving from the stopped position into the position for beginning to start, and to be retracted between the beginning to start and the actual starting of the combustion engine.

If required, the tensioner comprises a hydraulic damping member, having a differential hydraulic leak, the hydraulic leak being quicker when the tensioner is released than when it is retracted.

The invention can also enable, as a result of the prior rotation of the rotary electrical machine in the opposite direction, the travel, in the released state, of the tensioner to he increased. The result of this, during the starting stage, strictly speaking, that immediately follows the rotation in the opposite direction, and due to the increase in the return travel of the tensioner a id a greater resistance of this tensioner, is that sufficient time is provided to start the combustion engine before the stiff length of belt returns to a length that exposes the belt to risk of sliding.

In another embodiment of the invention, the tensioner, for example of the mechanical type, is arranged such as to remain locked in the position for beginning to start at least until the combustion engine has actually started.

In other words, the length of the stiff length of belt is constant during the starting stage.

The sliding risk of the belt is reduced by an increase in the tension in this stiff length of belt.

For example, the tensioner comprises a spring, particularly a spiral, helical or flat-type spring.

The device can, if desired, comprise a component for locking the tensioner in the position for beginning to start, this component comprising at least: a clutch, an electromagnet and a ratchet wheel, an electric motor with an endless screw, etc.

According to one aspect of the invention, the control system is arranged in order to operate a reverse rotation of the rotary electrical machine, in the second direction, in order to move the crankshaft pulley of the combustion engine into a position limiting the resisting torque of the combustion engine during the movement of the first compression.

Preferably, the device comprises a system for controlling the rotary electrical machine, that is arranged to selectively operate the rotation of the rotary electrical machine in the first and second directions.

The control system comprises, for example, at least one switch arranged in order to selectively connect position sensors for a rotor of the rotary electrical machine to controls of arms of an inverter.

The control system can comprise, if desired, at least a microcontroller or an ASIC.

The rotary electrical machine is, for example, a synchronous machine, particularly of polyphase type.

If required, the rotary electrical machine is of the reversible type, being in particular a starter-alternator.

In an alternative, the rotary electrical machine is a belt starter.

The subject matter of the invention is also a rotary electrical machine, particularly a starter alternator for a motor vehicle, which machine is arranged to start a combustion engine, the electrical machine being linked with a control system for operating the rotation of the electrical machine in a first direction in order to start the combustion engine and, in a stage prior to starting, in a second direction the opposite of the first direction.

A further subject matter of the invention is a method for starting a combustion engine, particularly of a motor vehicle, using a rotary electrical machine, which is arranged in order to start the combustion engine via the rotation, in a first direction, of a transmission member, particularly of a belt, connecting the rotary electrical machine to the combustion engine, a tensioner being provided in order to press on a length of the transmission member that runs between the rotary electrical machine and the combustion engine, the method comprising the following steps:

rotating, in advance, the belt in a second direction opposite of the first direction, the tensioner then moving from a stopped position into a position for beginning to start, then rotating the belt in the first direction in order to start the combustion engine.

The device according to the invention can comprise one or more tensioners.

BRIEF DESCRIPTION OF THE DRAWINGS

The invention can be better understood upon reading the following detailed description of non-limiting embodiments of the invention, and upon examining the appended drawing wherein:

FIGS. 2A-2E illustrate various operating stages of the starter device of FIG. 1;

FIGS. 3A-3D correspond to curves showing various physical characteristics for the operating stages of FIGS. 2A-2E, FIGS. 4 and 5 show, schematically and partially, two control system examples for the device of FIG. 1.

DETAILED DESCRIPTION

Figure 1:
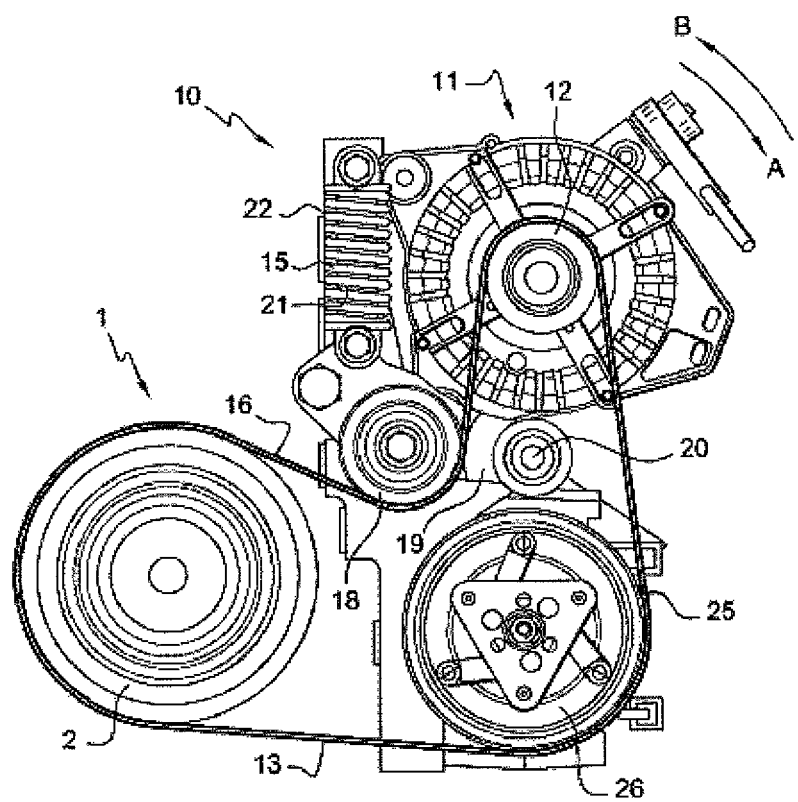
FIG. 1 shows, schematically and partially, a motor vehicle combustion engine facade and a starter device in accordance with the invention.

FIG. 1 shows a front facade of a motor vehicle combustion engine 1, over which extends a crankshaft pulley 2 which can be rotationally driven by the combustion engine when the latter is operating.

A starter device 10 for starting the combustion engine 1 is mounted at the facade of the engine.

This device 10 comprises:
- a rotary electrical machine in the form of a starter-alternator 11 comprising a drive member formed, in the considered example, by a pulley 12,
- a belt 13 collaborating with the pulley 12 of the rotary electrical machine 11 and with the combustion engine 1 in order that the latter can be started using the belt 13 rotationally driven by the rotary electrical machine 11 in a first direction A,
- a tensioner 15, of hydraulic type, pressing against a length 16 of the belt 13 that runs between the electrical machine 11 and the combustion engine 1, it being possible, as the rotary electrical machine rotates in a second direction B opposite of the first direction A, for the tensioner 15 to be brought from a stopped position into a position for beginning to start the combustion engine 1 during a preparation stage executed prior to a starting stage, the transition from the stopped position to the position for beginning to start being accompanied by lengthening of the length 16 of belt and/or by increasing the tension in this length 16 of the belt.

In the considered example, the tensioner 15 presses on the length 16 of belt via a roller 18 rotationally mounted on a bracket 19, which is fixed on the one hand in a pivoting manner on a pivot stud 20 of the facade, and on the other hand also in a pivoting manner at an end of a hydraulic damping member 21 of the tensioner 15.

The hydraulic member 21 is surrounded by a spring 22, particularly a helical spring, and can be released or retracted according to the effort to which the tensioner 15 is subjected.

This hydraulic member 21 has a differential hydraulic leak, the hydraulic leak being quicker when the hydraulic member 21 is released than when it is retracted, in the damping stage.

When the hydraulic member 21 is released or retracted, the roller 18 is moved and the length of the length 16 of belt changes.

The tensioner 15 enables, in normal operation, the control of the average tension, particularly by keeping it substantially constant, within the length 16 of belt.

For example, the length of the length 16 of belt reduces gradually between the position for beginning to start and the actual starting of the combustion engine.

The belt 13 is also used, via a length 25 of belt, to drive an accessory pulley 26, linked, for example, to an air conditioner compressor, which is not shown.

The rotation of the starter-alternator 11 is operated by a control system 28 shown extremely simplistically in FIG. 2A, arranged to selectively operate the rotation of the start-alternator 11 in the first direction A and second direction B.

Figure 4:
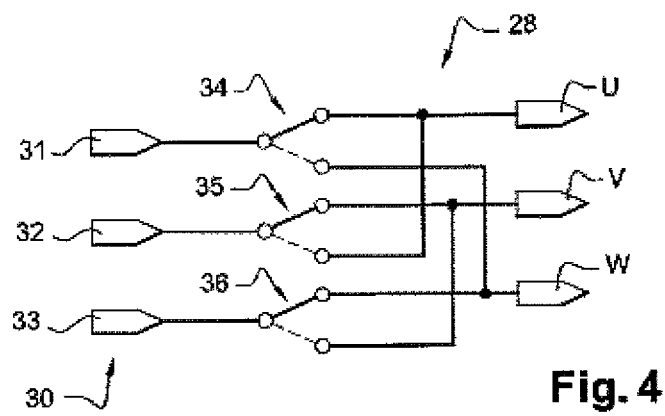

As illustrated in FIG. 4, the control system 28 can comprise, for example, a position detector 30 formed by three Hall-effect sensors 31-33 enabling the position of a rotor of the starter-alternator 11 to be detected.

The sensors 31-33 are, for example, separated from one another by an electrical angle of 120°.

The sensor 31, 32 and 33, respectively, is linked to an arm U, V and W, respectively, of an inverter of the electric machine 11.

The control system 28 further includes three switches 34-36 each linked with a sensor 31-33.

The switch 34, for example, is arranged to selectively connect the sensor 31 to the arms U or V of the inverter.

To rotate the rotary electrical machine 11 in the direction B prior to starting, strictly speaking, of the combustion engine 1, the control system 28 acts on the switches 34-36 such that the sensor 31 is assigned to the arm W, the sensor 32 to the arm U and the sensor 33 to the arm V (see the changing of the switches which is shown in dotted line).

It is therefore possible to rotate the rotary electrical machine 11 in the reverse direction, in the direction B, with an optimum advance.

Figure 5:
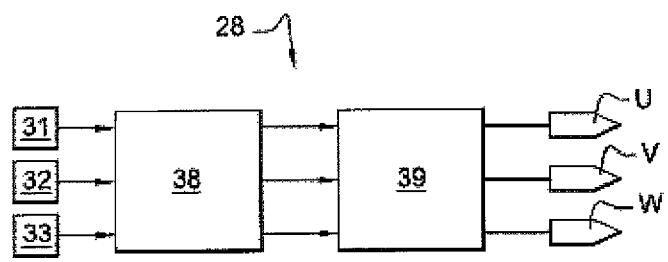

In an alternative, as illustrated in FIG. 5, the control system 28 comprises a microcontroller or an ASIC (Application Specific Integrated Circuit) 38 inserted between the sensors 31-33, and the inverter 39.

Of course, the number of phases of the electrical machine 11 can be greater than three, for example, seven for a seven-phase machine.

Referring to FIGS. 2A-2E and 3A-3D, various operating phases of the starter device 10 will now be described.

In step 2A, the tensioner 15 is in the stopped position and has a length L1.

In step 2B, the starter-alternator 11 trolled by the control system 28 so as to carry out a prior rotation in the direction of the arrow B during the preparation stage, which is immediately prior to the starting stage of the starter device 10.

The effect of this reverse rotation is to enable the length 16 of belt to lengthen and the tensioner 15 to be released. The tensioner 15 then has a length L2 that is greater than L1. The length 16 of belt is a 'slack' length of belt during this step 2B.

In step 2C, immediately after step 2B, the starter-alternator 11 is controlled in order to rotate according to the arrow A, in order to transmit a sufficient torque (via the length 16 of belt which is then a stiff length of belt) to the combustion engine 1 in order to start it during the starting stage executed immediately following the preparation stage.

Due to the prior rotation in the reverse direction according to the arrow B, it is possible to increase the travel, in the released state, of the tensioner 15. The effect of this is, during the starting stage, strictly speaking, and as a result of the increase in the return travel of the tensioner 15 and a greater resistance of this tensioner 15, to provide sufficient time to start the combustion engine 1.

During this step 2C, the length L3 of the tensioner 15 reduces from L2 towards L1.

In step 2D, the combustion engine 1 has started.

In step 2E, the starter-alternator 11 driven by the combustion engine 1 operates as an alternator, producing electrical power.

During this operation as an alternator, the length 16 of belt has a length L5 greater than L1.

The graphs in FIGS. 3A-3D illustrate the development of the torque of the electrical machine 11, of the rotational speed of the electrical machine 11, of the mechanical tension in the length 16 of belt and of the hydraulic travel linked with the hydraulic member 21 of the tensioner 15, respectively, for the succession of steps 2A-2E.

Figure 6:
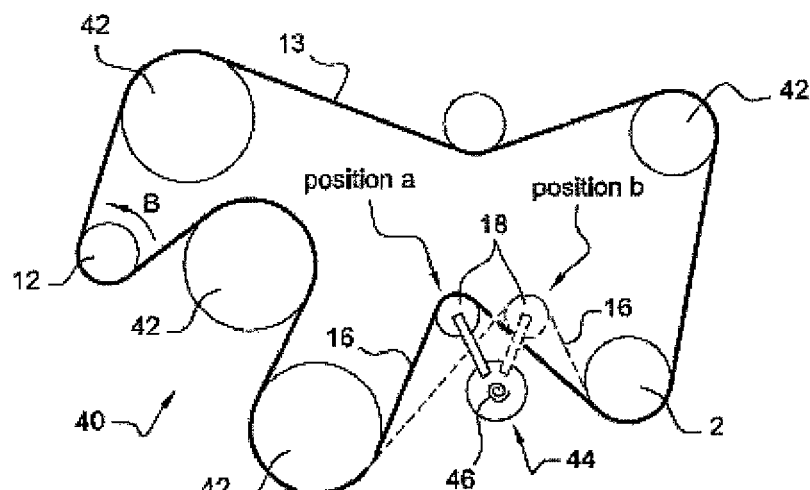
FIG. 6 shows, schematically and partially, a starter device in accordance with another embodiment of the invention.

FIG. 6 shows a starter device 40 in accordance with another embodiment of the invention.

This device 40, following the example of the device 10 described above, comprises a belt 13 arranged to transmit a torque from an electrical machine 11 equipped with a pulley 12, to a combustion engine 1 on the crankshaft pulley 2 thereof.

The belt 13 drives accessory pulleys 42.

The device 40 includes a tensioner 44 provided with a roller 18 in contact with the length 16 of the belt 13.

It is possible, as the rotary electrical machine rotates in a reverse manner according to the arrow B, for the tensioner 44 to be brought from a stopped position (position a in FIG. 6) into a position for beginning to start the combustion engine (position b in FIG. 6), the movement from the stopped position to the position for beginning to start being accompanied by a lengthening of said length of belt and by an increase in the mechanical tension in this length of belt.

The tensioner 44, of mechanical type, is arranged such as to remain locked in the position for beginning to start until the combustion engine has actually started.

The tensioner 44 comprises, in the considered example, a spring 46, for example of spiral type.

The device 40 can comprise a component for locking the tensioner 44 in the position for beginning to start, this component comprising at least: a clutch, an electromagnet and a ratchet wheel, an electric motor with an endless screw, etc.

Of course, the invention is not limited to the embodiments which have just been described.

For example, the electrical machine 11 can be a machine other than a starter-alternator (claw machine).

This machine 11 can, for example, be a synchronous machine with magnets, with a double-excitation wound rotor, an asynchronous machine, with variable reluctance, or a direct-current machine.

The invention claimed is:

1. A starter device (10) for a combustion engine 1 of a motor vehicle, comprising:
    a rotary electrical machine (11) comprising a drive member (12);
    an endless transmission member comprising a belt (13) or a chain, drivingly coupling the drive member of the rotary electrical machine with the combustion engine in order to start the combustion engine using the endless transmission member rotationally driven by the rotary electrical machine in a first direction (A) during a starting stage in order to start the combustion engine;
    a control system for operating the rotation of the rotary electrical machine in the first direction (A) during the starting stage and in a second direction (B) opposite of the first direction (A) during a preparation stage executed prior to the starting stage; and
    a tensioner (15) pressing against a length (16) of the endless transmission member running between the rotary electrical machine and the combustion engine;
    the rotary electrical machine rotatable in the second direction (B) opposite of the first direction in order to transition the tensioner from a stopped position into a position for beginning to start the combustion engine;
    the transition from the stopped position to the position for beginning to start being accompanied by lengthening of the length of the endless transmission member and/or by increasing the tension in the length of the endless transmission member.

2. The device according to claim 1, wherein the tensioner (15) is arranged such that, once the combustion engine has started, the length (16) of the endless transmission member returns to a lesser length than in the position for beginning to start.

3. The device according to claim 1, further comprising a roller (18) in contact with the length of the transmission member, wherein the roller is arranged so as to be moved when the tensioner is brought from the stopped position into the position for beginning to start.

4. The device according to claim 1, wherein the tensioner (15) is arranged such that the length of the length of the endless transmission member gradually reduces between the beginning to start and the actual starting of the combustion engine.

5. The device according to claim 4, wherein the tensioner (15) is arranged so as to be able to be released when moving from the stopped position into the position for beginning to start, and to be retracted between the position for beginning to start and the actual starting of the combustion engine.

6. The device according to claim 5, wherein the tensioner comprises a hydraulic damping member (21) having a differential hydraulic leak, the hydraulic leak being quicker when the tensioner is released than when it is retracted.

7. The device according to claim 1, wherein the control system (28) is provided to operate a reverse rotation of the electrical machine, in the second direction, in order to move a crankshaft pulley of the combustion engine into a position limiting the resisting torque of the combustion engine during the movement of a first compression.

8. The device according to claim 7, wherein the control system comprises at least a microcontroller (38) or an ASIC.

9. The device according to claim 1, wherein the control system (28) for controlling the rotary electrical machine (11) is arranged to selectively operate the rotation of the rotary electrical machine in the first and second directions.

10. The device according claim 9, wherein the control system comprises an inverter and at least one switch (34; 35; 36) provided to selectively connect position sensors (31; 32; 33) of a rotor of the rotary electrical machine to arms of the inverter.

11. The device according to claim 1, wherein the rotary electrical machine (11) is a synchronous machine.

12. The device according to claim 1, wherein the rotary electrical machine (11) is a starter-alternator.

13. A starter device for a combustion engine of a motor vehicle, comprising:
a rotary electrical machine comprising a drive member;
a transmission member comprising a belt drivingly coupling the drive member of the rotary electrical machine with the combustion engine in order to start the combustion engine using the transmission member rotationally driven by the rotary electrical machine in a first direction; and
a tensioner pressing against a length of the transmission member running between the rotary electrical machine and the combustion engine;
the rotary electrical machine rotatable in a second direction opposite of the first direction in order to transition the tensioner from a stopped position into a position for beginning to start the combustion engine;
the transition of the tensioner from the stopped position to the position for beginning to start being accompanied by lengthening of the length of transmission member and/or by increasing the tension in the length of transmission member.

14. A rotary electrical machine (11) forming a starter-alternator for a motor vehicle and arranged to start a combustion engine, the rotary electrical machine being linked with a control system for operating the rotation of the rotary electrical machine in a first direction during a starting stage in order to start the combustion engine and in a second direction opposite of the first direction during a preparation stage executed prior to the starting stage;
the control system comprising an inverter and at least one switch (34; 35; 36) provided to selectively connect position sensors (31; 32; 33) of a rotor of the rotary electrical machine to arms (U; V; W) of the inverter.

15. A method for starting a combustion engine of a motor vehicle using a starter device (10) comprising a rotary electrical machine (11), an endless transmission member (13) connecting the rotary electrical machine to the combustion engine and a tensioner (15), the rotary electrical machine (11) provided to start the combustion engine via the rotation in a first direction of the endless transmission member during a starting stage, the tensioner (15) being provided to press on a length of the endless transmission member running between the rotary electrical machine and the combustion engine, the method comprising the following steps:
rotating the endless transmission member in a second direction opposite of the first direction during a preparation stage executed prior to the starting stage so as to move the tensioner from a stopped position into a position for beginning to start;
rotating the endless transmission member in the first direction during a starting stage, executed subsequent to the preparation stage, in order to start the combustion engine.

* * * * *